United States Patent
Herron

(10) Patent No.: US 7,616,341 B2
(45) Date of Patent: Nov. 10, 2009

(54) SYSTEM AND METHOD FOR METADATA CONTROLLED MULTI-CONFIGURED HALFTONE SCREENING

(75) Inventor: Stephen K. Herron, Ladera Ranch, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 902 days.

(21) Appl. No.: 10/889,418

(22) Filed: Jul. 12, 2004

(65) Prior Publication Data
US 2006/0007493 A1    Jan. 12, 2006

(51) Int. Cl.
G06F 15/00 (2006.01)
G06K 1/00 (2006.01)
H04N 1/60 (2006.01)

(52) U.S. Cl. ................ 358/1.9; 358/3.06
(58) Field of Classification Search ........... 358/3.2, 358/3.23, 536, 1.1, 1.9, 1.15, 1.13, 1.16, 358/1.18

See application file for complete search history.

(56) References Cited

U.S. PATENT DOCUMENTS

| | | | |
|---|---|---|---|
| 5,406,379 A | 4/1995 | Kingsley et al. | |
| 5,742,405 A | 4/1998 | Spaulding et al. | |
| 5,861,960 A * | 1/1999 | Suzuki et al. | 382/239 |
| 6,014,226 A | 1/2000 | Harrington et al. | |
| 6,239,829 B1 | 5/2001 | Curry | |
| 6,252,675 B1 | 6/2001 | Jacobs | |
| 6,256,104 B1 | 7/2001 | Rumph et al. | |
| 6,327,043 B1 | 12/2001 | Rumph et al. | |
| 6,671,064 B2 | 12/2003 | Rumph et al. | |
| 6,975,431 B1 * | 12/2005 | Sugizaki | 358/3.06 |
| 7,031,025 B1 * | 4/2006 | He et al. | 358/3.09 |
| 2001/0030769 A1 | 10/2001 | Jacobs | |
| 2002/0159094 A1 | 10/2002 | Bybell et al. | |
| 2002/0171873 A1 | 11/2002 | Chang | |
| 2003/0007184 A1 | 1/2003 | Luo et al. | |
| 2003/0043345 A1 | 3/2003 | Westort et al. | |
| 2003/0081228 A1 | 5/2003 | Spaulding et al. | |
| 2003/0142327 A1 | 7/2003 | Abhyankar et al. | |
| 2006/0274381 A1 * | 12/2006 | Simard et al. | 358/426.06 |

* cited by examiner

*Primary Examiner*—Douglas Q Tran
(74) *Attorney, Agent, or Firm*—Tucker Ellis & West LLP

(57) ABSTRACT

The present invention is directed to a system and method for halftone screening. A system for halftone screening includes a memory including a look-up table, the look-up table including screen frequency data representative of the selected screen frequencies for an associated visual output rendering device and tonal level data corresponding to the screen frequency data. The system further includes means adapted for receiving image data representative of a continuous tone image, segmenting means adapted for segmenting received image data into apportioned image data representative of a plurality of image portions, each image portion including a tonal value associated therewith, and means adapted for communicating data representative of each tonal value to the look-up table, whereby corresponding tonal level data is output therefrom.

9 Claims, 2 Drawing Sheets

SYSTEM AND METHOD FOR METADATA CONTROLLED MULTI-CONFIGURED HALFTONE SCREENING

BACKGROUND OF THE INVENTION

The present invention relates generally to halftone screening processes and, more particularly, to a method and system for metadata controlled multi-configured halftone screening.

Halftone screening processes are processes used to transform a continuous-tone image into a binary image that may be rendered and perceived by an observer as the original continuous-tone image. Halftone screening processes typically apply one or more halftone screens to a continuous-tone image. The result is binary image that appears to be made up of individual dots when viewed up close; but, when observed from a typical viewing distance, appears as the original continuous-tone image. Currently, halftone screening processes are used in printing devices such as laser printers, dot matrix printers, and inkjet printers; and the like.

Halftoning is necessary because printing devices are not capable of producing all of the shades or colors contained in continuous tone images. For example, a laser printer may have only one color of ink; typically, black. There are no grays. Halftoning permits the appearance of a number of shades of gray.

Color laser printers are similar, though more complex. Again, color laser printers are not capable of reproducing all of the colors that may be found in a continuous-tone image. Commonly, color printers contain only four colors of ink; namely, cyan, magenta, yellow, and black. For color reproduction, four different screens are required along with three different filters. The filters break the continuous-tone image down into the four colors of ink, allowing simulation of all the colors found in the continuous-tone image.

Halftone screens are created using screen frequencies measured in lines per inch (lpi), and as such, a screen frequency is often represented by a grid. Each square in the grid then represents a halftone cell capable of holding a halftone dot. Higher screen frequencies produce finer halftone screens, while lower screen frequencies produce coarser halftone screens. Further, multiple screen frequencies are represented by multiple grids or halftone screens.

Screen frequencies are selected based on the contents of a continuous-tone image. For example, a continuous-tone image may contain a mixture of images, fonts, and office graphics. Further, a "smooth" halftone is suitably used for the images, while a "detail" halftone is suitably used for the fonts and office graphics. When two portions of a continuous-tone image require different halftones, first one halftone is selected for a first portion and then a second halftone is selected for the second portion. Such an approach works reasonably well on an area-by-areas basis. However, switching between halftones within a continuous-tone image containing a mixture of images, fonts and office graphics is difficult. Moreover, the processing when using multiple halftone screens can become slow and burdensome.

Thus, there exists a need for a method and system which eases transitions between halftones as applied to continuous-tone images.

SUMMARY OF THE PRESENT INVENTION

The present invention provides the benefits of multiple halftones as applied to continuous-tone images, while easing transitions between halftones. The invention is directed to a system and method for halftone screening. More particularly, the present invention is directed to metadata controlled multi-configured halftone screening.

In accordance with the present invention, there is provided a system for halftone screening. The system comprises a memory including a look-up table, the look-up table including, screen frequency data representative of the selected screen frequencies for an associated visual output rendering device and tonal level data corresponding to the screen frequency data. The system further comprises means adapted for receiving image data representative of a continuous tone image, segmenting means adapted for segmenting received image data into apportioned image data representative of a plurality of image portions, each image portion including a tonal value associated therewith, and means adapted for communicating data representative of each tonal value to the look-up table, whereby corresponding tonal level data is output therefrom.

Further, in accordance with the present invention, there is provided a method of halftone screening. The method comprises creating a look-up table including screen frequency data representative of selected screen frequencies or an associated visual output rendering device and tonal level data corresponding to the screen frequency data. The method further comprises receiving image data representative of a continuous tone image, segmenting received image data into an apportioned image data representative of a plurality of image portions, each image portion including a tonal value associated therewith, and communicating data representative of each tonal level to the look-up table, whereby corresponding tonal level data is output therefrom.

Additional objects, advantages and novel features of the invention will be set forth in part in the description which follows, and in part will become apparent to those skilled in the art upon examination of the following or may be learned by practice of the invention. The objects and advantages of the invention may be realized and attained by various structures and methods as covered by the patent claims.

BRIEF DESCRIPTION OF THE DRAWINGS

The accompanying figures incorporated in and forming a part of the specification, illustrates several aspects of the present invention, and together with the description serve to explain the principles of the invention. In the figures.

DETAILED DESCRIPTION OF PREFERRED AND ALTERNATE EMBODIMENTS

Figure 1:
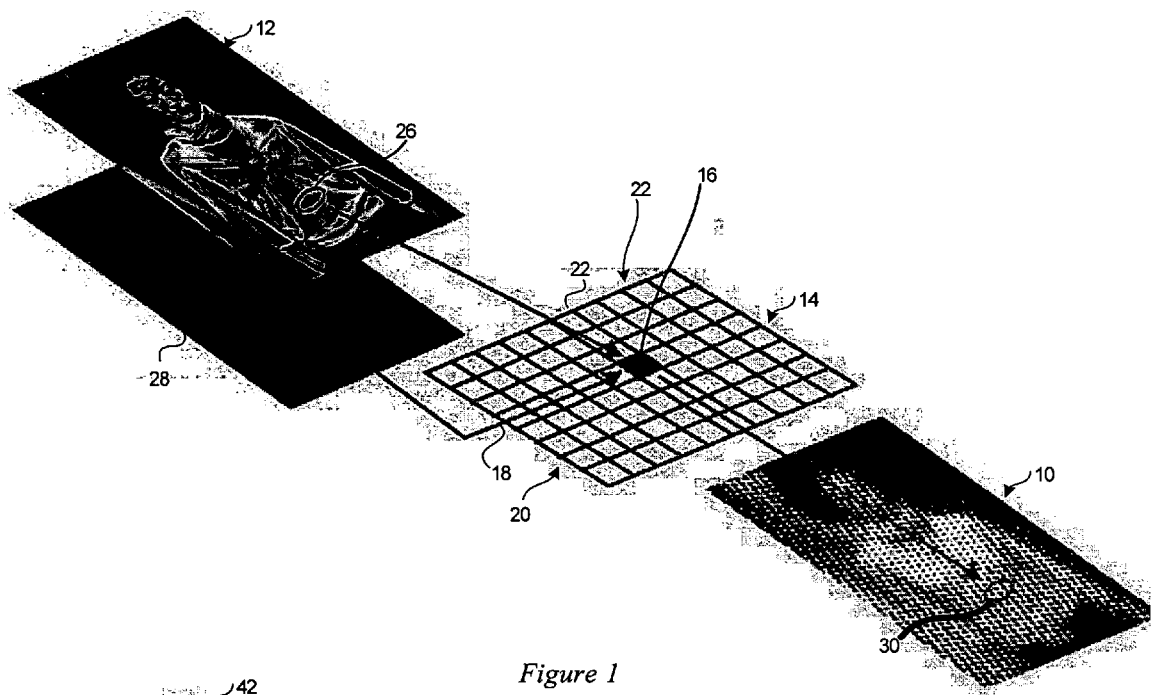
FIG. 1 is an illustration of a halftone image generated from a continuous-tone image using a two-dimensional look-up table and in accordance with principles of the present invention.

The present invention is directed to a system and method for halftone screening. As used herein, the term halftone screening refers to processes used to transform a continuous-tone image into a binary image that may be rendered and perceived by an observer as the original continuous-tone image. Halftone screening is suitable in visual output rendering devices or printing devices such as, for example, laser printers, dot matrix printers, and inkjet printers. Turning to FIG. 1, there is presented an illustration of a halftone image 10 generated from a continuous-tone image 12 using a lookup table 14. As will be appreciated by those of ordinary skill in the art, look-up table 14 is suitably stored in any commonly used form of electronic memory. More specifically, look-up table 14 is a two-dimensional look-up table containing a series of halftone cell descriptions, one of which is indicated at reference numeral 16. A two-dimensional lookup table of halftones consists of a number of halftone descriptions in the horizontal or X direction by a number of halftones in the vertical or Y direction, forming a matrix of halftones. For a typical printer with the capability of making 256 shades, the matrix suitably consist of as many as 16 different halftones in the X direction and 16 different halftones in the Y direction. Each halftone would be capable or reproducing one tonal level.

Further, and as also illustrated, two-dimensional look-up table 14 relates screen frequency data, e.g., screen frequencies or line-per-inch (lpi) frequencies, one of which is indicated at reference numeral 18, arranged in rows 20 to corresponding tonal level data, e.g., tonal levels, one of which is indicated at reference numeral 22, arranged in columns 24. Those of ordinary skill in the art will appreciate that tonal level data are suitable grayscales in the case of, for example, a laser printer having only black ink. Similarly, those of ordinary skill in the art will also appreciate that tonal level data are suitable shades of colors in the case of, for example, a color laser printer having cyan, magenta, yellow, and black inks.

To generate halftone image 10, continuous-tone image 12 is apportioned or segmented into parts, one of which is indicated at reference numeral 26, each part having a tonal value, and a map 28 is produced of the parts. As will appreciated by those of ordinary skill in the art, map 28 is suitably referred to as tag plane or a metadata map. Moreover, an image mask or metadata writer is suitable to segment continuous-tone image 10 into parts 26 and produce a map 28 of the parts 26.

Once continuous-tone image 12 is segmented into parts 26 and a map 28 is produced of the parts 26, two-dimensional look-up table 14 is suitably indexed. For example, and as also illustrated, screen frequency 18 is selected from two-dimensional look-up table 14 using map 28 of parts 26, while tonal level 22 is selected from two-dimensional look-up table 14 using the tonal value of part 26. The selected cell 16 is used to generate a halftone output 30, and, in turn, halftone image 10.

Means adapted for receiving image data 26 representative of a continuous tone image 12 are well known in the art and are suitably accomplished by any method utilized by those skilled in the art of image processing. A raster image is suitably segmented into selected areas, such as low and high spatial frequency areas, tonal areas, areas of various colors, etc.

Further, segmenting means adapted for segmenting received image data into apportioned image data representative of a plurality of image portions, each image portion including a tonal value associated therewith; and means adapted for communicating data representative of each tonal value to the look-up table 14, whereby corresponding tonal level data 22 is output therefrom are also well known in the art and is suitably accomplished by any method utilized by those skilled in the art of image processing. Low and high frequency area separation are suitably performed by a low-pass convolution filter; tonal area separation by a histogram filter; and separation by colors by a suitable data matching function as will be appreciated by one of ordinary skill in the art.

Figure 2:
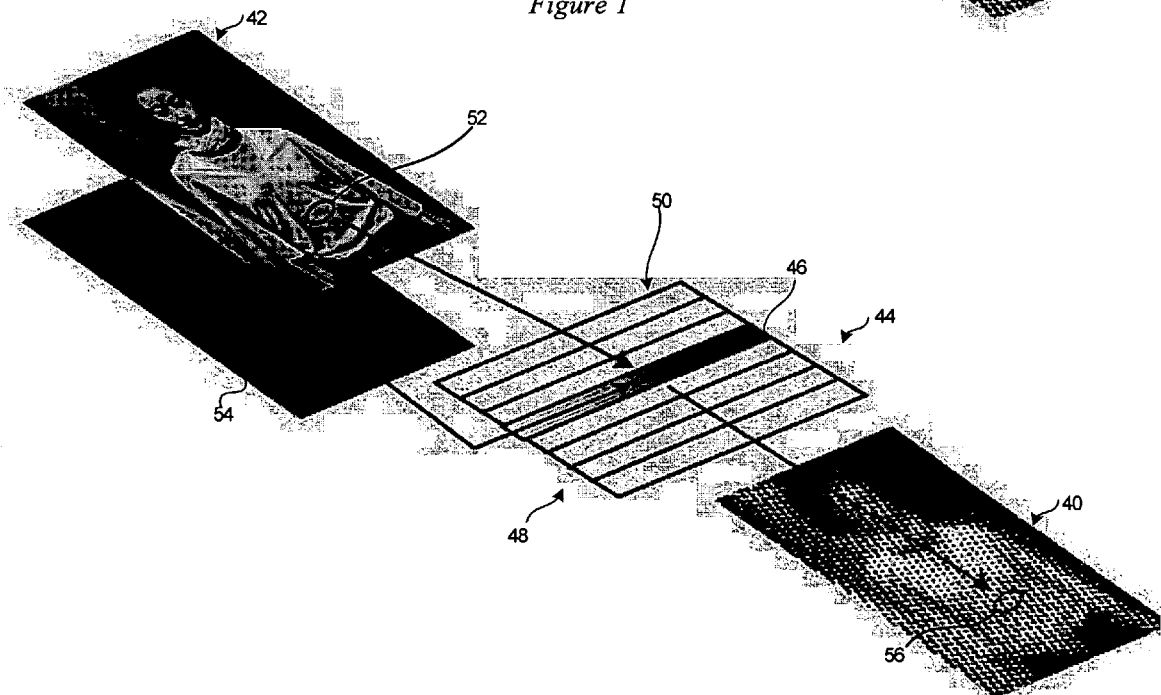
FIG. 2 is an illustration of a halftone image generated from a continuous-tone image using a table of halftone arrays.

Referring now to FIG. 2, there is presented an illustration of a halftone image 40 generated from a continuous-tone image 42 using a look-up table 44. As will be appreciated by those of ordinary skill in the art, look-up table 44 is suitably stored in any commonly used form of electronic memory. More specifically, look-up table 44 is a one-dimensional table containing a series of halftone arrays, one of which is indicated at reference numeral 46. Further and as also illustrated, look-up table 44 relates screen frequency data or screen or lpi frequencies to corresponding tonal level data or tonal levels. As illustrated, the screen frequencies 46 appear in rows 48, while the multiple tonal levels appear as a column 50.

Those of ordinary skill in the art will appreciate that tonal level data are suitably grayscale in the case of, for example, a laser printer having only black ink. Similarly, those of ordinary skill in the art will also appreciate that tonal level data are suitable shades of colors in the case of, for example, a color laser printer having cyan, magenta, yellow, and black inks.

To generate halftone image 40, continuous-tone image 42 is apportioned or segmented into parts, one of which is indicated at reference numeral 52, each part having a tonal value, and a map 54 is produced of the parts. As will appreciated by those of ordinary skill in the art, map 54 may also be referred to as tag plane or a metadata map. Moreover, an image mask or metadata writer is suitably used to segment continuous-tone image 42 into parts 52 and produce a map 54 of the parts 52.

Once continuous-tone image 42 is segmented into parts 52 and a map 54 is produced of the parts 52, one-dimensional look-up table 44 is suitably indexed. For example, and as also illustrated, screen frequency 46 is selected from look-up table 44 using map 54 of parts 52, while a tonal level, e.g., the magnitude of the array, is selected from the look-up table 44 using the tonal value of part 52. The selected array 46 is used to generate a halftone output 56, and, in turn, halftone image 40.

Suitable mean adapted for receiving image data 52 representative of a continuous tone image 42 are well known in the art and is suitably accomplished by any method utilized by those skilled in the art of image processing. The segmenting mechanism advantageously comprises passing a filter over the raster image and writing an associated tag plane or metadata. For example, a low-pass convolution filter would suitably divide image data into several areas, such as by frequency, flat areas, gradients, detail, patterns, and the like.

The subject system suitably employs two representative methods of adding metadata:

1. The filtering phase then creates a metadata plane. They would then consist of numerical descriptions. Screen 1 for flat areas, Screen 2 for gradients, Screen 3 for detail, Screen 4 for patterns. Each descriptor has a corresponding halftone location in the one-dimensional series of halftones or in the two-dimensional matrix. The segmenting filter leaves the raster image untouched.
2. The filtering phase suitably divides the image into corresponding parts by writing image data to various buffers. Each buffer advantageously employs a tag number indicating which halftone to use on the segmented image.

Further, the system functions to segment received image data into apportioned image data representative of a plurality of image portions, each image portion including a tonal value associated therewith. Data representative of each tonal value is communicated to the look-up table 44, whereby corresponding tonal level data 46 is output therefrom, and is suitably accomplished by any method utilized by those skilled in the art of image processing. A selection of a halftone arrangement of dots is the same for both one-dimensional and two-dimensional look-up tables. Metadata specifies halftone type and tone value of a raster image associated with the dot arrangement for that value.

Then the halftone dot arrangement is selected then that arrangement is written to a new halftone buffer. When every pixel in the raster image has been converted to a halftone arrangement of dots, the buffer is saved as a halftone image or sent to the rendering device for making marks on paper.

Referring to FIGS. 1 and 2, since all of the required screen frequencies or lpi frequencies are arranged in a single table rather than in separate tables for each respective screen frequency, the selection of the appropriate halftone cell is flexible and fast. Moreover, the transitions between halftones as applied to a continuous-tone image is eased.

Figure 3:
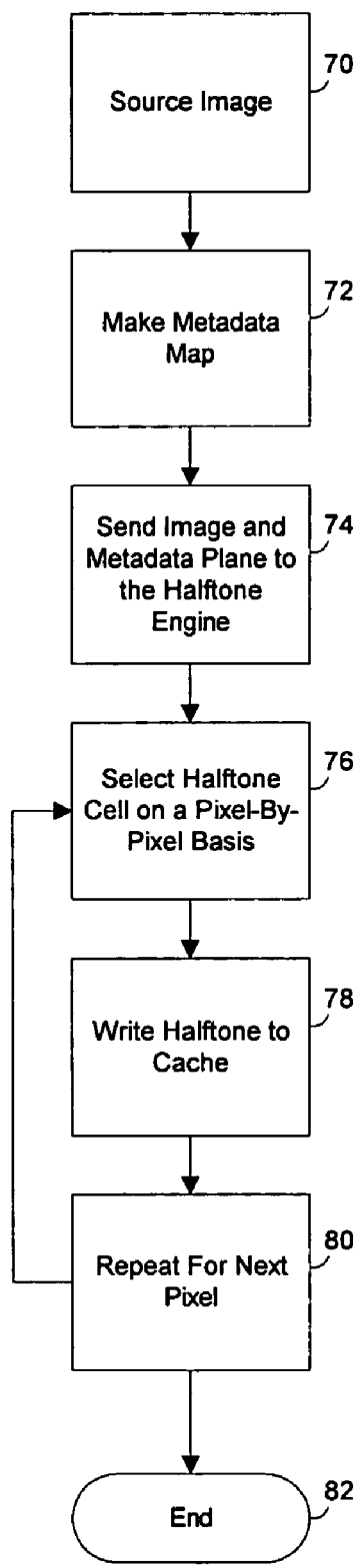
FIG. 3 is a flowchart illustrating the program flow of a screening method in accordance with principles of the present invention.

Turning to FIG. 3, a flowchart illustrating the program flow of a halftone screening method in accordance with principles of the present invention is shown. As will be appreciated by those of ordinary skill in the art, such a program may be executed by a processor such as, for example, a raster image processor (RIP) or a postscript processor commonly implemented in or used in conjunction with visual output rendering devices such as printing devices.

The program begins in step 70 wherein a metadata writer surveys a continuous-tone image for data representative of each pixel in a halftone image. More specifically, pre-established criteria are used to write the data. For example, and as will be appreciated by those of ordinary skill in the art, for gray levels 0 through 66 a screen 1 is written, for grey levels 67 through 166 a screen 2 is written, and for gray levels 166 through 255 a screen 3 is written. Further, a screen 1 is for text, a screen 2 is for graphics, and a screen 3 is for line art as found in the continuous-tone image. Next, in step 72, a metadata map is made from the continuous-tone image.

Once the continuous-tone image has been surveyed, the data written, and the metadata map created, step 74 is entered. In step 74, the data and the metadata map or plane is sent to a halftone engine. Next, in step 76, the halftone engine selects halftone cells on a pixel-by-pixel basis. More specifically, the halftone engine uses the image data and the metadata plane to look up the associated halftone cell from a table. Such a table relates numerous screen frequencies to multiple tonal levels.

Next, in step 78, the halftone for each cell or pixel is written to a cache memory, and, in step 80, control is returned to step 76 for the next pixel. Once all of the halftones have been written to cache memory the halftone image is output, e.g., sent to a printer, and the program ends in step 82.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed:

1. A system for halftone screening comprising:
   a memory including a look-up table, the look-up table including,
      screen frequency data representative of the selected screen frequencies for an associated visual output rendering device, and
      tonal level data corresponding to the screen frequency data;
   means adapted for receiving image data representative of a continuous tone image;
   segmenting means adapted for segmenting received image data into apportioned image data representative of a plurality of adjacent image portions corresponding to a metadata map, wherein the segmenting means includes masking means adapted for masking received image data to form the apportioned image data;
   testing means adapted for testing each of the plurality of image portions relative to preselected criteria;
   means adapted for assigning one of a plurality of metadata values to each of the plurality of image portions in accordance with an output of the testing means, the metadata values including values corresponding to properties from a set comprising frequency, gradient, detail, and pattern;
   means adapted for communicating data representative of each tonal value as an array and each corresponding metadata value to the look-up table relating screen frequency and tonal level data in accordance with the metadata map, such that a corresponding grayscale halftone level data is output in accordance therewith; and
   means adapted for rendering the received image in accordance with grayscale halftone level data corresponding to each of the plurality of image portions.

2. The system of halftone screening of claim 1, wherein the look-up table is a two-dimensional look-up table relating screen frequency data and tonal level data.

3. The system of halftone screening of claim 1, further comprising means adapted for generating a halftone output based on the selection of the screen frequency data and the tonal level data.

4. The system of halftone screening of claim 3, further comprising means adapted for generating a halftone image using the halftone output.

5. A method of halftone screening, comprising the steps of:
   generating a look-up table, wherein the look-up table includes,
      screen frequency data representative of selected screen frequencies for an associated visual output rendering device, and
      tonal level data corresponding to the screen frequency data;
   receiving image data representative of a continuous tone image;
   segmenting received image data into an apportioned image data representative of a plurality of adjacent image portions corresponding to a metadata map, wherein the received image data is masked to form the apportioned image data;
   testing each of the plurality of image portions relative to preselected criteria;
   assigning one of a plurality of metadata values to each of the plurality of image portions in accordance with an output of the testing, the metadata values including values corresponding to properties from a set comprising frequency, gradient, detail, and pattern;
   communicating data representative of each tonal level as an array and each corresponding metadata value to the look-up table relating screen frequency and tonal level data in accordance with the metadata map, such that a corresponding grayscale halftone level data is output in accordance therewith; and
   rendering the received image in accordance with grayscale halftone level data corresponding to each of the plurality of image portions.

6. The method of claim 5, wherein the look-up table is a two-dimensional look-up table relating screen frequency data and tonal level data.

7. The method of claim 5, wherein the tonal level data are arrays and the look-up table is a one dimensional look-up table relating screen frequency data and tonal level data.

8. The method of claim 5, further comprising the step of generating a halftone output based on the selection of the screen frequency data and the tonal level data.

9. The method of claim 8, further comprising the step of generating a halftone image using the halftone output.

* * * * *